United States Patent
Terashima et al.

(10) Patent No.: US 12,481,068 B2
(45) Date of Patent: Nov. 25, 2025

(54) INFORMATION PROCESSING SYSTEM AND ELECTRONIC DEVICE

(71) Applicant: SEIKO EPSON CORPORATION, Tokyo (JP)

(72) Inventors: Yasuhiro Terashima, Matsumoto (JP); Ryota Hirakawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 298 days.

(21) Appl. No.: 18/190,110

(22) Filed: Mar. 26, 2023

(65) Prior Publication Data

US 2023/0324561 A1     Oct. 12, 2023

(30) Foreign Application Priority Data

Mar. 28, 2022  (JP) .................................. 2022-051338

(51) Int. Cl.
| | |
|---|---|
| *G01S 19/07* | (2010.01) |
| *G01S 19/49* | (2010.01) |
| *G01S 19/51* | (2010.01) |

(52) U.S. Cl.
CPC ............ *G01S 19/071* (2019.08); *G01S 19/49* (2013.01); *G01S 19/51* (2013.01)

(58) Field of Classification Search
CPC ......... G01S 19/071; G01S 19/49; G01S 19/51
USPC ............ 342/357.44, 357.77, 357.26, 61, 458
See application file for complete search history.

(56) References Cited

U.S. PATENT DOCUMENTS

| | | |
|---|---|---|
| 2017/0265037 A1 | 9/2017 | Sawada et al. |
| 2018/0113472 A1* | 4/2018 | Sakr ..................... G05D 1/0276 |
| 2022/0043099 A1 | 2/2022 | Da et al. |

FOREIGN PATENT DOCUMENTS

| | | |
|---|---|---|
| JP | 2017166856 | 9/2017 |
| JP | 2018-066728 | 4/2018 |
| JP | 2021030867 | 3/2021 |
| JP | 2022514430 | 2/2022 |

OTHER PUBLICATIONS

Yudai Higuchi et al., "Position Estimation for Mobile Wireless Networks with Suppressed Positioning Count by Detecting Static Nodes", Commemorating the 50th Anniversary of the Foundation of the Information Processing Society of Japan (72nd) National convention, Mar. 2010, with English translation thereof, pp. 1-7.

* cited by examiner

*Primary Examiner* — Bo Fan
(74) *Attorney, Agent, or Firm* — JCIPRNET (57) ABSTRACT

The information processing system includes a server and an electronic device. The electronic device includes a communicating unit; a position detector detecting a position; an information acquiring unit acquiring position information for each of a plurality of other electronic devices and error information that indicates an error in the position information; a determining unit determining whether the electronic device is surrounded by the plurality of other electronic devices, and determining whether the electronic device is in a specific state; and a transmission control unit transmitting correction information that includes the position and the position information to the server when the electronic device is determined to be surrounded by the plurality of other electronic devices and to be in the specific state. The server corrects the position of the electronic device based on the correction information.

11 Claims, 8 Drawing Sheets

INFORMATION PROCESSING SYSTEM AND ELECTRONIC DEVICE

The present application is based on, and claims priority from JP Application Serial Number 2022-051338, filed on Mar. 28, 2022, the disclosure of which is hereby incorporated by reference herein in its entirety.

BACKGROUND

1. Technical Field

The present disclosure relates to an information processing system and an electronic device.

2. Related Art

A device having a position detecting function using radio waves from artificial satellites is known. In the case of this type of device, an error may occur in position detection depending on the state of radio waves received from artificial satellites, and thus it is conceivable to employ a method of correcting position information. For example, JP-A-2018-066728 discloses a method of correcting global positioning system (GPS) data on a first vehicle by using GPS data on a second vehicle and relative position data indicating a relative position of the first vehicle relative to the second vehicle.

In recent years, it is conceivable to use smaller devices such as a device having a position detecting function and worn on a human body to be used. In the case of such a small device, the power consumption needs to be suppressed in order to enable driving for a long period of time. The method disclosed in JP-A-2018-066728 is a method suitable for a vehicle or other environments in which relatively large electrical power is available, and is difficult to be applied to a device for which a reduction in the power consumption is demanded. Thus, there has been a demand for correcting the position information of devices with a method that consumes less power.

SUMMARY

An aspect according to the present disclosure is an information processing system including a server and an electronic device, the electronic device including a first communicating unit configured to communicate with a plurality of other electronic devices, a second communicating unit configured to communicate with the server, a position detector configured to detect a position, an information acquiring unit configured to acquire position information for each of the plurality of other electronic devices and error information indicating an error in the position information, a determining unit configured to determine, based on the position information for each of the plurality of other electronic devices, whether the electronic device is surrounded by the plurality of other electronic devices, and determine whether the electronic device is in a specific state in which the error information for each of the plurality of other electronic devices all indicates a first threshold value or less, and a transmission control unit configured to transmit correction information including the position and the position information to the server when the electronic device is determined to be surrounded by the plurality of other electronic devices and to be in the specific state, wherein the server corrects the position of the electronic device based on the correction information.

Another aspect according to the present disclosure is an electronic device including a first communicating unit configured to communicate with a plurality of other electronic devices, a second communicating unit configured to communicate with a server, a position detector configured to detect a position, an information acquiring unit configured to acquire position information for each of the plurality of other electronic devices and error information indicating an error in the position information, a determining unit configured to determine, based on the position information for each of the plurality of other electronic devices, whether the electronic device is surrounded by the plurality of other electronic devices, and determine whether the electronic device is in a specific state in which the error information for each of the plurality of other electronic devices all indicates a first threshold value or less, and a transmission control unit configured to transmit correction information including the position and the position information to the server when the electronic device is determined to be surrounded by the plurality of other electronic devices and to be in the specific state.

DESCRIPTION OF EXEMPLARY EMBODIMENTS

Below, embodiment according to the present disclosure will be described with reference to the drawings.

1. Overview of Information Processing System

Figure 1:
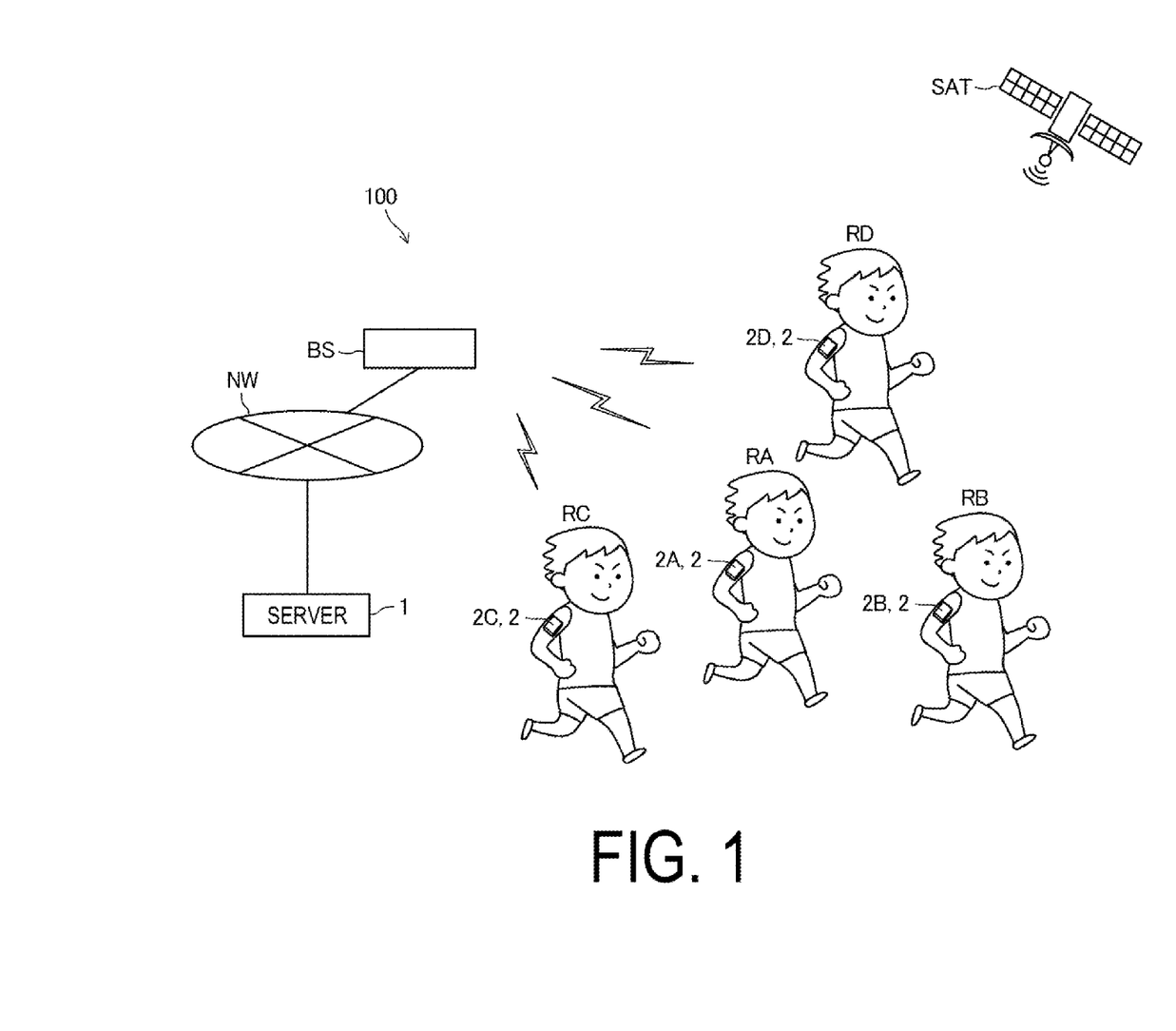
FIG. 1 is a schematic view schematically illustrating an information processing system.

FIG. 1 is a diagram illustrating the configuration of an information processing system 100.

The information processing system 100 includes a server 1 and a plurality of devices 2. FIG. 1 illustrates four devices 2A, 2B, 2C, and 2D. However, this is merely one example. There is no limitation as to the number of devices 2 included in the information processing system 100. When the devices 2A, 2B, 2C, and 2D and other devices 2 are not separately recognized, they are referred to as a device 2. In the present disclosure, the device 2 serves as one example of an electronic device.

The device 2 included in the information processing system 100 is a mobile device. The device 2 is, for example, a device that can be mounted on a human body, baggage, or other items, and includes a battery 29 serving as power supply that will be described later. There is no limitation as to the shape of the device 2. For example, the shape of the device 2 includes a disk shape and a planar plate shape. In addition, the shape of the device 2 may be other shapes. For example, the device 2 may be configured to include a belt used to fix the device 2 to a human body or baggage, or specifically, may be a wristwatch-type device 2. In addition, the devices 2A, 2B, 2C, and 2D may have shapes differing from each other.

The device 2 is connected to the server 1 through a communication network NW and a wireless base station BS in a manner that they can communicate with each other.

The device 2 has a position determination function configured to receive a signal transmitted by an artificial satellite SAT to detect a position of the device 2. The present embodiment describes an example in which the device 2 uses a global navigation satellite system (GNSS) to perform the position determination. The device 2 transmits, to the server 1, the position information obtained through the position determination. The position determination function or communication function of the device 2 will be described later.

The communication network NW is a data communication network including a dedicated line, a public communication network, or other communication lines, and is, for example, the Internet. The communication network NW may be a local area network (LAN) or a wide area network (WAN). The communication network NW may include various types of devices such as an access point, a base station, a router, or a gateway, which are not illustrated.

A wireless base station BS performs communication such as Wi-Fi (trade name) or a low power wide area (LPWA) with individual devices 2. The wireless base station BS may be, for example, a device called a wireless router or an access point.

As an application example of the information processing system 100, FIG. 1 illustrates an example in which a participant of a sports event wears the device 2. This sports event is a competition in which a plurality of competitors move, and includes, for example, a marathon, a triathlon, a duathlon, a bicycle race, or other competitions. Each of the competitors that participate in the sports event wears the device 2 on its body or mounts the device 2 on an item used in the competition. FIG. 1 illustrates an example in which a competitor wears, on its arm, the device 2 including a belt. There is no limitation on the number of competitors nor the number of devices 2. By way of example, FIG. 1 illustrates an example in which four people of a first competitor RA, a second competitor RB, a third competitor RC, and a fourth competitor RD wear devices 2A, 2B, 2C, and 2D, respectively. In the present embodiment, when the devices 2A, 2B, 2C, and 2D are not separately recognized, they are referred to as a device 2.

The devices 2A, 2B, 2C, and 2D each performs position determination at preset cycles, and each transmits the position information to the server 1. The server 1 receives and stores the position information transmitted by each of the devices 2A, 2B, 2C, and 2D. With this configuration, the server 1 accumulates information concerning the latest positions of and the trace of the positions of the first competitor RA, the second competitor RB, the third competitor RC, and the fourth competitor RD. Thus, by using the information processing system 100, it is possible to gain the positions of the competitors in the competition, and obtain information concerning the progress status of the competition.

The accuracy of the position determination by the device 2 depends on the reception state in which the device 2 receives a signal from the artificial satellite SAT. For example, in a state in which a plurality of competitors densely exist, a signal from the artificial satellite SAT weakens due to human bodies or is blocked by human bodies. This possibly deteriorates the accuracy of the position determination by the device 2. Thus, the information processing system 100 has a function of correcting the position information concerning the device 2. For example, when the accuracy of the position information concerning the device 2A deteriorates in a state in which the first competitor RA is surrounded by the second competitor RB, the third competitor RC, and the fourth competitor RD, the position information concerning the device 2A is corrected in the information processing system 100. The configuration and the operation concerning such correction of the position information will be described below.

2. Configuration of Information Processing System

Figure 2:
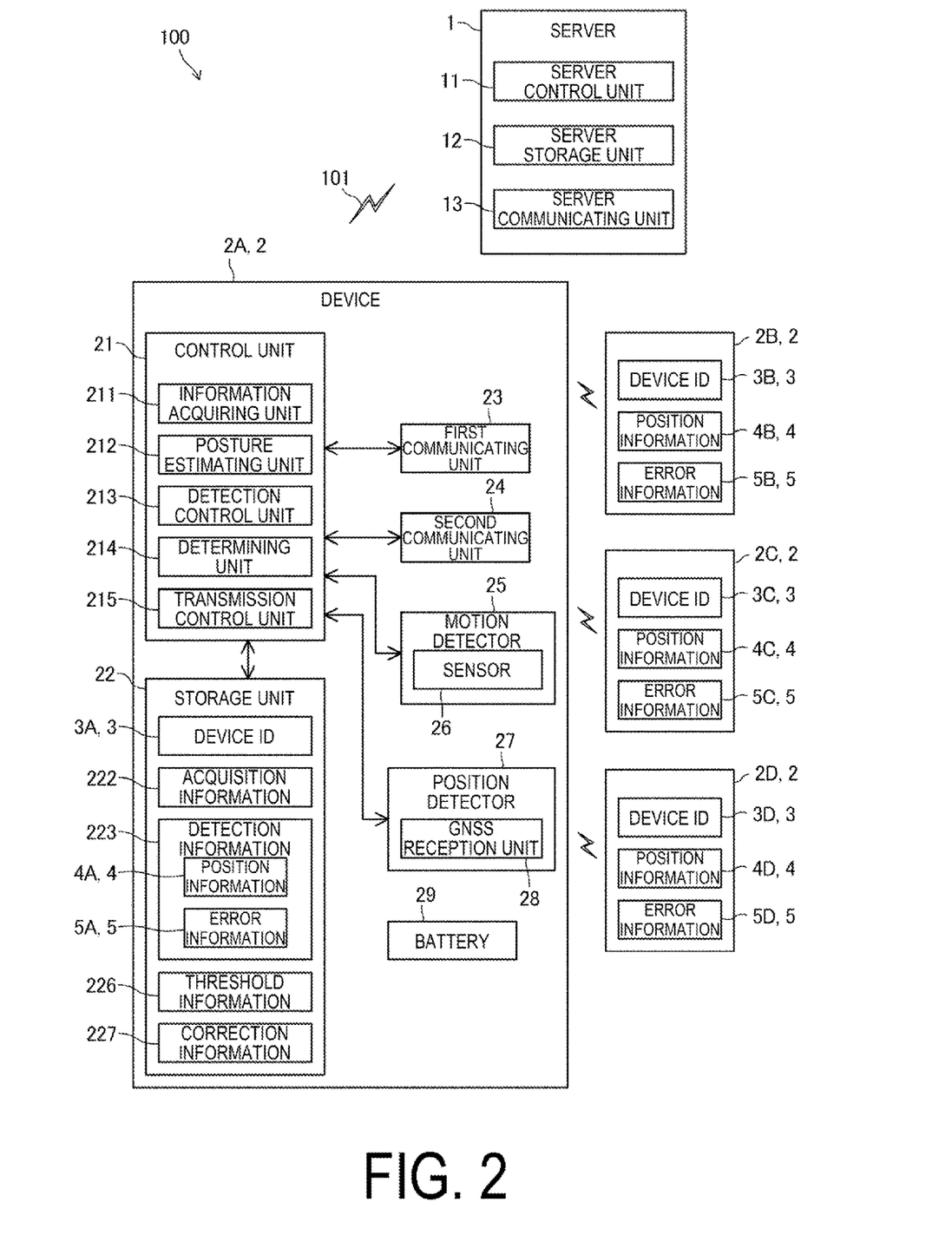
FIG. 2 is a diagram illustrating the configuration of the information processing system.
Figure 3:
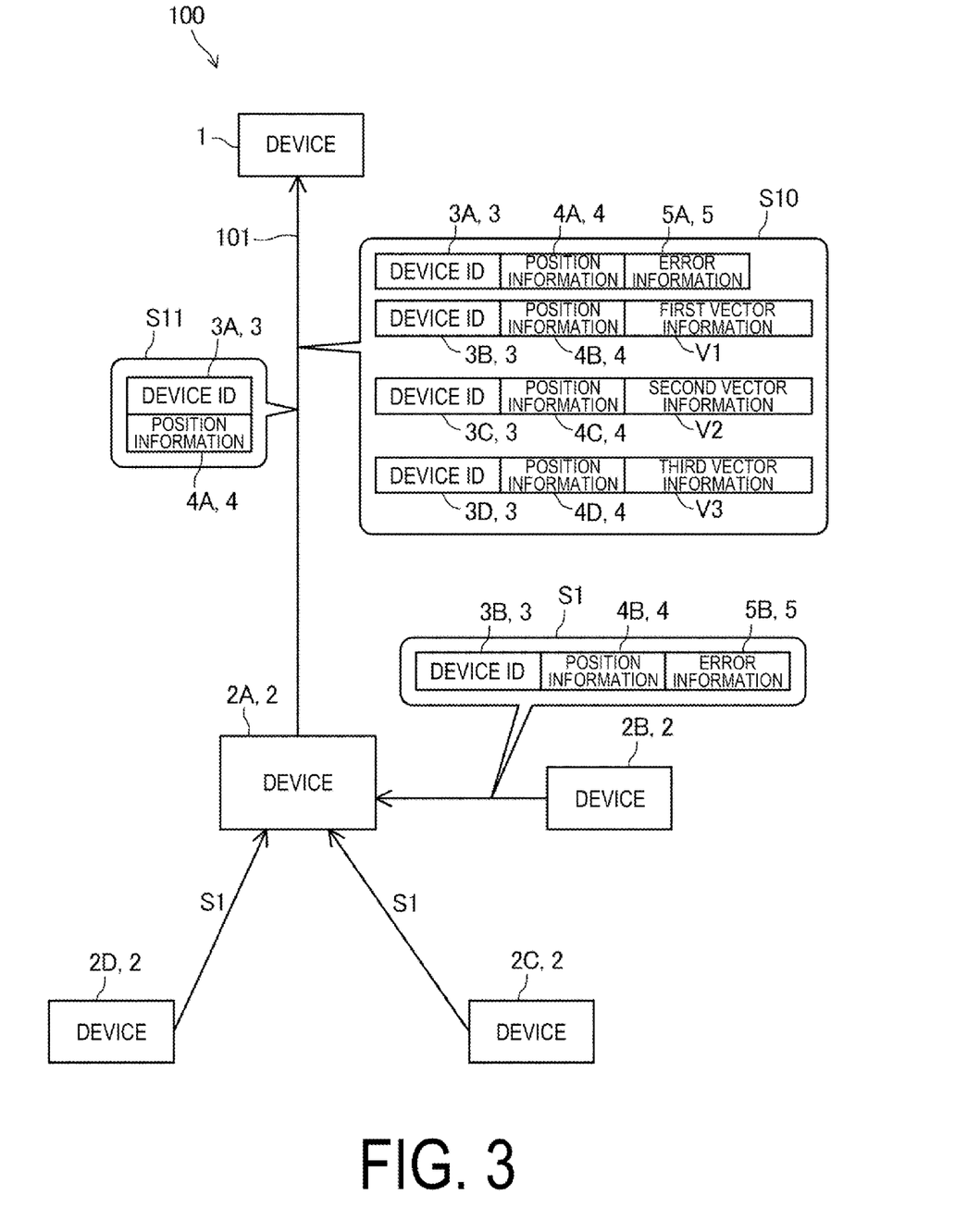
FIG. 3 is an explanatory diagram illustrating information transmitted or received in the information processing system.

FIG. 2 is a diagram illustrating the configuration of the information processing system 100. FIG. 3 is an explanatory diagram of information received and transmitted by the information processing system 100. FIGS. 2 and 3 illustrate a communication path 101 through which the server 1 and the device 2 are connected to each other. The communication path 101 is a path that includes the communication network NW and the wireless base station BS and through which data communication is performed between the server 1 and the device 2.

FIG. 2 illustrates details of the configuration of the device 2A. It can be said that the configuration of the device 2A is a basic configuration of the device 2 in the information processing system 100. It may be possible that the devices 2B, 2C, and 2D and other devices 2 have a configuration similar to that of the device 2A. Thus, in the present embodiment, the configuration of the device 2A will be described.

The devices 2A, 2B, 2C, and 2D each has a device ID 3. Specifically, the device 2A has a device ID 3A. The device 2B has a device ID 3B. The device 2C has a device ID 3C. The device 2D has a device ID 3D. When these are not separately recognized, these are referred to as a device ID 3.

The device ID 3 is identification information with which one device 2 can be distinguished from other devices 2, and includes, for example, a number, a symbol, or other signs. All devices 2 included in the information processing system 100 each stores a device ID 3 that has been assigned in advance.

The device 2 adds the device ID 3 to information that the device 2 transmits to other devices 2 or the server 1. This enables a device that receives the information to identify the device 2 serving as the transmission source of this information based on the device ID 3.

The device 2A includes a control unit 21, a storage unit 22, a first communicating unit 23, a second communicating unit 24, a motion detector 25, a position detector 27, and the battery 29.

Both the first communicating unit 23 and the second communicating unit 24 are wireless communicating devices configured to perform wireless communication in accordance with control of the control unit 21.

The second communicating unit 24 performs wireless communication at a distance longer than the first communicating unit 23. In other words, the first communicating unit 23 is a device configured to perform wireless communication at a distance shorter than the second communicating unit 24 using a short-range communication technology.

The first communicating unit 23 is a communicating device including an antenna or a modem, which are not illustrated, and performs data communication between the plurality of devices 2. The first communicating unit 23 performs wireless communication, for example, in accordance with the Bluetooth (trade name) low energy standard. In addition, as for the communication scheme that the first communicating unit 23 performs, it is possible to employ ultra-wideband (UWB), Zigbee (trade name), or other personal area network (PAN) technologies. Below, description will be made of an example in which the device 2 performs communication using a Bluetooth Mesh technology by the first communicating unit 23.

The first communicating unit 23 has a direction detection function and a distance detecting function using the Bluetooth communication. For example, the first communicating unit 23 includes an array antenna, and uses an angle of arrival (AoA) technology or an angle of departure (AoD) technology using the Bluetooth communication to detect directions of the other devices 2 relative to the device 2A.

For example, when the device 2A employs the AoA to detect the direction of the device 2B relative to the device 2A, the first communicating unit 23 uses an antenna array of the first communicating unit 23 to receive radio waves transmitted by the device 2B from one antenna. The device 2A calculates the direction of the emission source of the radio waves based on a phase difference of the radio waves received with the individual antennas that constitute the antenna array of the first communicating unit 23.

In addition, for example, when the device 2A employs the AoD to detect the direction of the device 2B relative to the device 2A, the device 2B uses each antenna that constitutes the antenna array to transmit the radio waves, and the device 2A uses a single antenna of the antenna array of the first communicating unit 23 to perform reception. The device 2A acquires an in phase-quadrature phase (IQ) sample from signals received with the antenna of the first communicating unit 23, and calculates the direction of the device 2B relative to the device 2A based on the IQ sample.

The distance detecting function of the first communicating unit 23 uses, for example, the received signal strength indicator (RSSI) and/or the transmission power (TxPower). These include a technique standardized for the Bluetooth communication.

When the direction detecting function or the distance detecting function by the first communicating unit 23 is performed, a beacon for detecting the direction or a beacon for detecting the distance may be transmitted or received between the device 2A and a device 2 that is a communication partner with which the device 2A performs communication.

It is only necessary that the device 2A can detect the directions of other devices 2 relative to the device 2A and the distances from the device 2A to other devices 2 using the first communicating unit 23. The technique described above is merely one example of the technique that can be employed for the device 2A and the other devices 2. Needless to say, it is possible to achieve the direction detecting function or the distance detecting function with other techniques.

The second communicating unit 24 is a communicating device including an antenna and a modem that are not illustrated in the drawing. The second communicating unit 24 transmits and receives various types of data to and from the server 1. For example, the second communicating unit 24 performs LPWA communication. No limitation is applied to specifications of the LPWA communication. For example, the second communicating unit 24 performs wireless communication in accordance with various types of standards such as NB-IoT, LTE-M, LTE Cat.NB1, Sigfox (trade name), LoRaWAN (trade name), Wi-Fi (trade name) HaLow, Wi-SUN (trade name), ELTRES (trade name), or ZETA (trade name). Furthermore, in addition to the LPWA communication, the second communicating unit 24 may be configured to perform the long term evolution (LTE) communication or the 5G cellular communication.

The motion detector 25 includes a sensor 26. The sensor 26 is a sensor configured to detect the posture of the device 2, and is a motion sensor including at least any one of an acceleration sensor, an angular velocity sensor, or a magnetic sensor. The sensor 26 may be an inertial measurement unit (IMU) in which a plurality of sensors are integrated.

The position detector 27 includes a GNSS reception unit 28. The GNSS reception unit 28 receives radio waves outputted by the artificial satellite SAT to perform position determination, and outputs position information indicating the position of the device 2. In addition, the GNSS reception unit 28 generates error information indicating an error included in the position obtained through the position determination by the GNSS reception unit 28, based on a signal received from the artificial satellite SAT. The error information is, for example, a value of deviation σ representing the degree of the error.

The battery 29 supplies power supply to each component of the device 2A through a power supply line that is not illustrated in the drawing. The battery 29 is a primary battery that can be replaced, or a secondary battery. The device 2A may include a charging circuit or a charging terminal that is not illustrated in the drawing and performs charging to the battery 29. In addition, the device 2A may include a non-contact charging device for performing charging of the battery 29.

The control unit 21 is a computer including a processor including one or more central processing units (CPU) or a micro-processing unit (MPU). The control unit 21 causes the processor to implement a program to control each component in the device 2A. The control unit 21 includes a nonvolatile read only memory (ROM) configured to store a program to be executed by the processor, and also includes a random access memory (RAN) that constitutes a work area concerning processing of the processor. The control unit 21 may be constituted by a semiconductor device in which the processor, the ROM, and the RAM are integrated. In addition, the processor of the control unit 21 may be constituted by programmed hardware.

The control unit 21 includes an information acquiring unit 211, a posture estimating unit 212, a detection control unit 213, a determining unit 214, and a transmission control unit 215. These are functional units implemented in cooperation of hardware and software with the processor executing the program. Alternatively, it may be possible to employ a configuration in which the control unit 21 includes hardware corresponding to the functional units.

The storage unit 22 is a nonvolatile storage device constituted by a semiconductor memory element or a magnetic storage device. The storage unit 22 stores the device ID 3A, an acquisition information 222, a detection information 223, a threshold information 226, and a correction information 227. The device ID 3A is identification information concerning the device 2A.

The information acquiring unit 211 causes the first communicating unit 23 to perform communication with a device 2 other than the device 2A to acquire information from the device 2 that is the communication partner device.

As illustrated in FIG. 2, the device 2B includes position information 4B detected using the sensor 26 included in the device 2B, and also includes error information 5B. Similarly, the device 2C includes position information 4C detected using the sensor 26 included in the device 2C, and also includes error information 5C. The device 2D includes position information 4D detected using the sensor 26 included in the device 2D, and also includes error information 5D. Below, when the position information 4B, 4C, 4D and the position information 4A are not separately recognized, they are referred to as position information 4. When the error information 5B, 5C, 5D and the error information 5A are not separately recognized, they are referred to as error information 5.

The information acquiring unit 211 uses the first communicating unit 23 to receive detection information S1 from the device 2B, as illustrated in FIG. 3. For example, as the information acquiring unit 211 makes a request to the device 2B for information, the detection information S1 is transmitted by the device 2B in response to the request. The detection information S1 includes the device ID 3B of the device 2B, the position information 4B detected by the device 2B, and the error information 5B indicating an error concerning the position information 4B.

Similarly, the information acquiring unit 211 acquires the detection information S1 from each of the device 2C and the device 2D. The information acquiring unit 211 can acquire the detection information S1 from a device 2 located within a range that the first communicating unit 23 can communicate, from among the other devices 2 that are not illustrated in FIG. 3.

The information acquiring unit 211 causes the storage unit 22 to store, as the acquisition information 222, information included in the acquired detection information S1.

The posture estimating unit 212 estimates the posture of the device 2A based on a result of detection by the sensor 26 included in the motion detector 25. For example, the posture estimating unit 212 identifies the front direction of the device 2A.

The detection control unit 213 causes the position detector 27 to detect the position. The detection control unit 213 causes the storage unit 22 to store, as the detection information 223, the position information 4A indicating the position detected by the GNSS reception unit 28 and the error information 5A indicating an error in the position information 4A. When the device 2A corresponds to the electronic device according to the present disclosure, the position information 4A corresponds to one example of first information, and the error information 5A corresponds to one example of second information. In this case, the devices 2B, 2C, and 2D correspond to one example of other electronic devices, and the position information 4B, 4C, and 4D corresponds to one example of position information for each of the other electronic devices. In addition, the error information 5B, 5C, and 5D corresponds to one example of error information for each of the other electronic devices.

The determining unit 214 determines whether to correct the position information 4A detected by the position detector 27. Details of determination made by the determining unit 214 will be described later. The determining unit 214 uses a first threshold value and a second threshold value. These threshold values are included in the threshold information 226 held by the storage unit 22.

The transmission control unit 215 transmits information to the server 1 with the second communicating unit 24. When the determining unit 214 determines that the position information 4A is corrected, the transmission control unit 215 generates the correction information 227 used by the server 1 to make correction, and causes the storage unit 22 to store the correction information 227. The transmission control unit 215 generates correction information S10 based on the correction information 227, and causes the second communicating unit 24 to transmit the correction information S10 to the server 1.

FIG. 3 illustrates the configuration of the correction information S10 transmitted by the device 2A to the server 1. The correction information S10 includes the device ID 3A, the position information 4A, and the error information 5A so as to be associated with each other. In addition, the correction information S10 includes information used to correct the position information 4A. The information used to correct the position information 4A is information concerning the device 2 existing around the device 2A. The present embodiment describes an example in which the devices 2B, 2C, and 2D are located in a range in which the device 2A can communicate. In this case, the correction information S10 transmitted by the device 2A includes: the position information 4B concerning the device 2B and first vector information V1; the position information 4C concerning the device 2C and second vector information V2; and the position information 4D concerning the device 2D and third vector information V3, so as to be associated with each other. The position information 4B may be associated with the device ID 3B. The position information 4C may be associated with the device ID 3C. The position information 4D may be associated with the device ID 3D. The first vector information V1, the second vector information V2, and the third vector information V3 will be described later.

Furthermore, when the determining unit 214 determines not to correct the position information 4A, the transmission control unit 215 generates position notification information S11 including the detection information 223, and transmits it to the server 1.

FIG. 3 illustrates the configuration of the position notification information S11 transmitted by the device 2A. The position notification information S1*l* includes the device ID 3A of the device 2A, and the position information 4A detected by the device 2A using the GNSS reception unit 28.

As described above, the devices 2B, 2C, 2D and the other device 2 are configured similarly to the device 2A. As with the device 2A, these devices 2 have a function of acquiring the detection information S1 from other devices 2 to transmit the correction information S10 or the position notification information S11 to the server 1.

The server 1 includes a server control unit 11, a server storage unit 12, and a server communicating unit 13.

The server control unit 11 is a computer including a processor including one or more CPUs or an MPU. The server control unit 11 causes the processor to implement a program to control each component in the server 1 in collaboration of hardware and software.

The server control unit 11 includes a nonvolatile ROM configured to store a program to be executed by the processor, and also includes a RAM that constitutes a work area concerning processing of the processor. The server control unit 11 may be constituted by a semiconductor device in which the processor, the ROM, and the RAM are integrated. In addition, the processor of the server control unit 11 may be constituted by programmed hardware.

The server storage unit 12 is a nonvolatile storage device constituted by a semiconductor memory element or a magnetic storage device. The server storage unit 12 stores information received from the device 2. The server communicating unit 13 is a communicating device configured to perform data communication with the device 2. For example, the server communicating unit 13 is a communicating device configured to perform data communication through the communication network NW. In addition, as with the second communicating unit 24, the server communicating unit 13 may be a wireless communicating device configured to perform wireless communication in accordance with a standard such as the LPWA communication. In this case, the serve 1 can perform wireless communication directly with the device 2. The server communicating unit 13 performs communication with the device 2 in accordance with control of the server control unit 11.

3. Operation of Information Processing System

Figure 4:
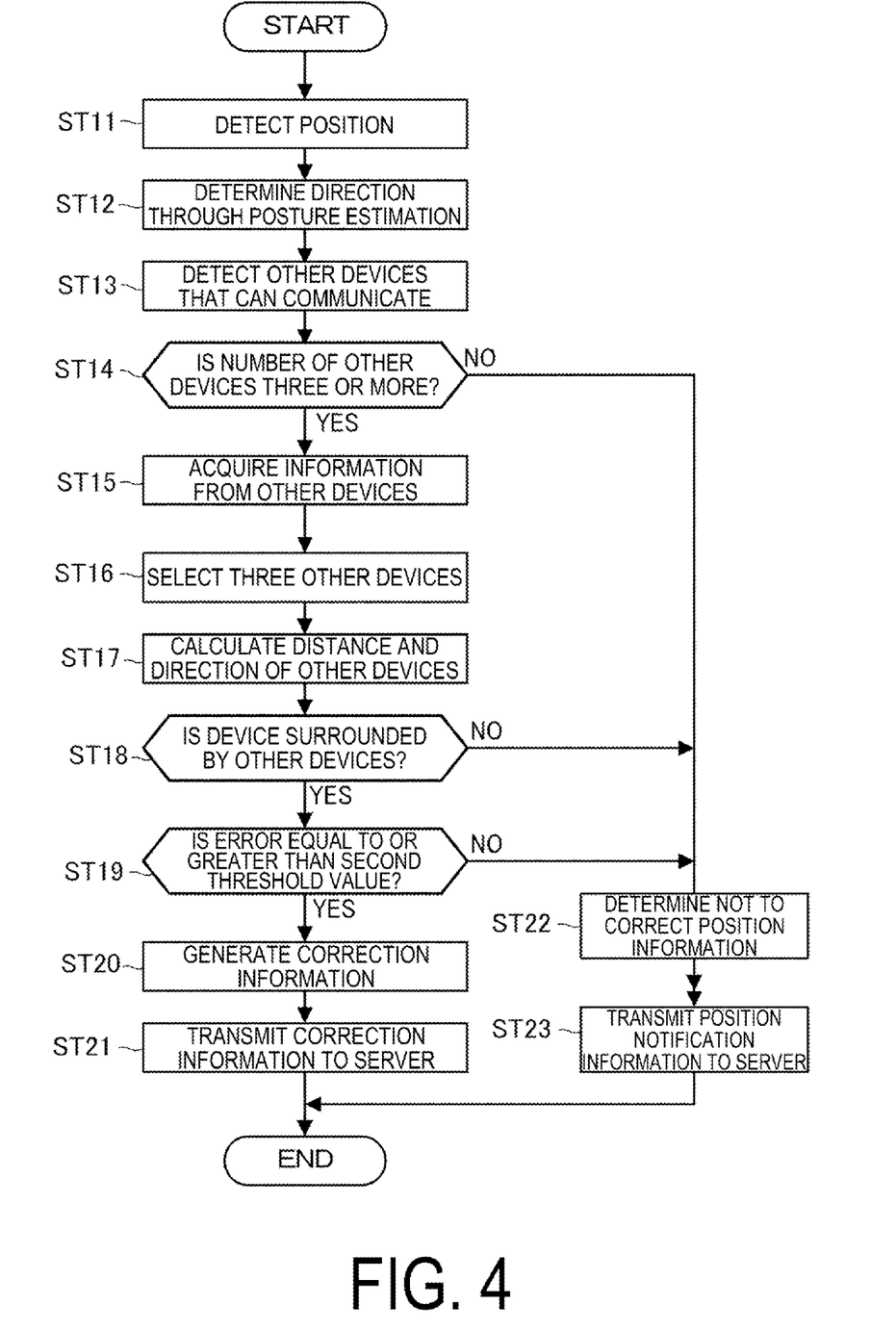
FIG. 4 is a flowchart illustrating operation of a device.

FIG. 4 is a flowchart illustrating operation of the device 2. FIG. 4 illustrates an operation of the device 2A when the devices 2B, 2C, and 2D are located in a range in which the device 2A can communicate.

The detection control unit 213 causes the position detector 27 to detect the position, and causes the storage unit 22 to store the position information 4A and the error information 5A (step ST11). Next, the posture estimating unit 212 estimates the posture of the device 2A based on a result of detection made by the motion detector 25 and identify the front direction of the device 2A (step ST12).

The determining unit 214 detects devices 2 other than the device 2A located in a range in which the first communicating unit 23 can communicate (step ST13). Below, devices 2 other than the device 2A are referred to as other devices 2.

The determining unit 214 determines whether there are three or more devices 2 that satisfy a condition, from among the other devices 2 detected in step ST13 (step ST14). The devices 2 that satisfy a condition are devices 2 of which error information 5 indicates that an error is equal to or less than the first threshold value. The first threshold value is, for example, 10 m.

When the number of devices 2 that satisfy the condition is equal to or less than 2 (step ST14; NO), the determining unit 214 moves to step ST23 that will be described later.

When the number of devices 2 that satisfy the condition is equal to or greater than three (step ST14; YES), the information acquiring unit 211 acquires the detection information S1 from the devices 2 detected in step ST14 (step ST15). Information included in the detection information S1 acquired in step ST15 is held by the storage unit 22 as the acquisition information 222.

The determining unit 214 refers to the acquisition information 222 to select three devices 2 (step ST16). The condition used to select the device 2 by the determining unit 214 in step ST16 is, for example, a distance from the device 2A. In this case, the determining unit 214 selects three devices 2 in the order of increasing distance from the device 2A. Here, the determining unit 214 may select the three devices 2 in the order from a device 2 having a smaller error indicated in the error information 5.

The determining unit 214 calculates, for the three devices 2 selected in step ST16, the distance from the device 2A and the direction of each of the devices 2 relative to the device 2A (step ST17). It can be said that the distance and the direction detected by the determining unit 214 in step ST17 are information concerning the relative position of each of the devices 2 relative to the device 2A. In step ST17, the determining unit 214 detects the direction with the AoA or the AoD described above using the first communicating unit 23, and detects the distance using the RSSI or TxPower. Note that, when selecting the device 2 based on the distance in step ST16, the determining unit 214 may detect the distance using the RSSI or TxPower, and here, the detected distance can be used in step ST17.

The determining unit 214 determines whether the device 2A is surrounded by the three devices 2 selected in step ST16 (step ST18). The operation of step ST18 is referred to as a surrounding determination process. In step ST18, this process is a process of determining whether the device 2A is in a specific state. The specific state represents a state in which the device 2A is surrounded by the three devices 2, and an error indicated by the error information 5 concerning the three devices 2 that surround the device 2A is equal to or less than the first threshold value. That is, the device 2A is in a state of being surrounded by the three devices 2 including the position information 4 having high accuracy.

Figure 5:
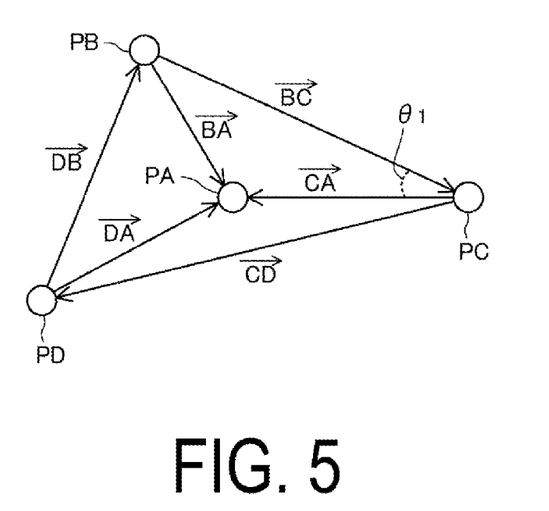
FIG. 5 is an explanatory diagram concerning a surrounding determination process.
Figure 6:
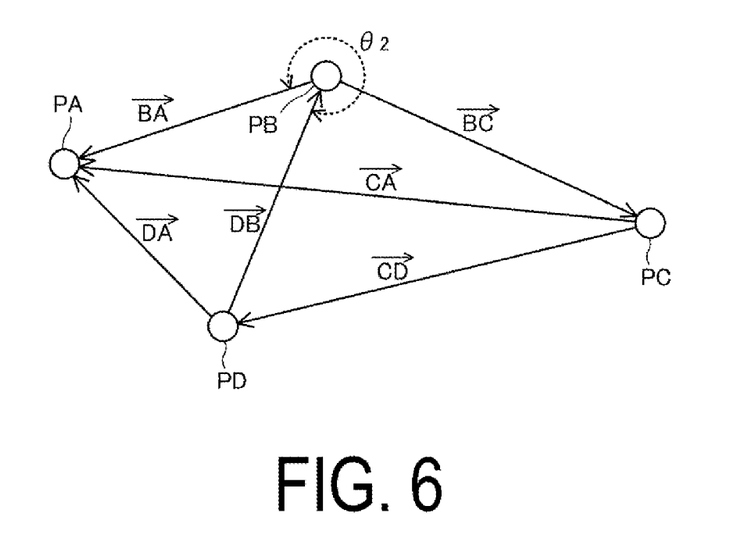
FIG. 6 is an explanatory diagram concerning a surrounding determination process.

FIGS. 5 and 6 are explanatory diagrams concerning the surrounding determination process. FIG. 5 illustrates an example in which the device 2A is surrounded by the devices 2B, 2C, and 2D. FIG. 6 illustrates an example in which the device 2A is not surrounded by the device 2B, 2C, or 2D.

In FIGS. 5 and 6, the positions of the devices 2A, 2B, 2C, and 2D based on the distance and the direction calculated by the device 2A in step ST17 are illustrated as positions PA, PB, PC, and PD. Arrows connecting two points among the positions PA, PB, PC, and PD each indicates a vector.

The determining unit 214 obtains a vector BA directed from the position PB toward the position PA, a vector CA directed from the position PC toward the position PA, and a vector DA directed from the position PD toward the position PA. These vectors are obtained based on the distance and the direction calculated in step ST17. For example, the vector BA indicates the direction and the distance between the device 2B and the device 2A.

Based on the vector BA, the vector CA, and the vector DA, the determining unit 214 calculates a vector BC directed from the position PB toward the position PC, a vector CD directed from the position PC toward the position PD, and a vector DB directed from the position PD toward the position PB.

The determining unit 214 obtains a vector product of the vector BC and the vector CA, and determines the plus/minus sign of the obtained vector product. The determining unit 214 obtains a vector product of the vector CD and the vector DA and a vector product of the vector DB and the vector BA, and determines the plus/minus sign of the obtained vector product.

The vector product of the vector BC and the vector CA can be expressed by using sin θ1 as indicated by the following Equation (1). Here, when the plus/minus sign of the vector product of the vector BC and the vector CA is plus, it can be said that the sin $\theta_1$ is a positive value, and hence, it is possible to say that the angle $\theta_1$ illustrated in FIG. 5 falls in $0 < \theta_1 < \pi$.

[Equation 1]

$$|\vec{BC}| \times |\vec{CA}| = |\vec{BC}| \cdot |\vec{CA}| \cdot \sin\theta_1 \tag{1}$$

Thus, when the plus/minus signs of the vector product of the vector BC and the vector CA, the vector product of the vector CD and the vector DA, and the vector product of the vector DB and the vector BA are all plus signs, it can be said that the position PA is located within a triangle formed by the position PB, the position PC, and the position PD. That is, the device 2A is surrounded by the devices 2B, 2C, and 2D.

For example, when the plus/minus sign of the vector product of the vector DB and the vector BA is minus, the position PA is located outside of a triangle formed by the position PB, the position PC, and the position PD, as illustrated in FIG. 6. In the example illustrated in FIG. 6, the vector product of the vector DB and the vector BA can be expressed by using sin $\theta_2$ as indicated by the Equation (2) described below. Here, when the plus/minus sign of the vector product of the vector BC and the vector CA is minus, it can be said that the sin $\theta_2$ is a negative value, and hence, it is possible to say that the angle $\theta_2$ illustrated in FIG. 6 falls in $\pi<\theta_2<2\pi$. That is, the position PA is not located within a triangle formed by the position PB, the position PC, and the position PD.

[Equation 2]

$$|\vec{DB}| \times |\vec{BA}| = |\vec{DB}| \cdot |\vec{BA}| \cdot \sin\theta_2 \qquad (2)$$

In step ST18, the determining unit 214 determines whether the device 2A is surrounded, based on whether the plus/minus signs of the vector product of the vector BC and the vector CA, the vector product of the vector CD and the vector DA, and the vector product of the vector DB and the vector BA are all plus signs.

In addition, when the plus/minus signs of the vector product of the vector BC and the vector CA, the vector product of the vector CD and the vector DA, and the vector product of the vector DB and the vector BA are all plus signs, the determining unit 214 determines that the device 2A is surrounded. Furthermore, when either of the plus/minus signs of the vector product of the vector BC and the vector CA, the vector product of the vector CD and the vector DA, and the vector product of the vector DB and the vector BA is minus, the determining unit 214 determines that the device 2A is not surrounded.

When any two of the vector BA, vector CA, and vector DA are parallel to each other, the determining unit 214 may be configured to determine whether the device 2A is surrounded, without performing a process of calculating the vector product of vectors. In this case, the determining unit 214 may determine that the device 2A is surrounded by the devices 2B, 2C, and 2D or may determine that the device 2A is not surrounded by the device 2B, 2C, or 2D.

Returned to FIG. 4, when the determining unit 214 determines that the device 2A is not surrounded by the device 2B, 2C, or 2D (step ST18; NO), the operation moves to step ST22.

When it is determined that the device 2A is surrounded by the devices 2B, 2C, and 2D (step ST18; YES), the determining unit 214 determines whether the error indicated by the error information 5A is equal to or greater than a second threshold value (step ST19). Step ST19 is a process of determining whether the accuracy of the position information 4A detected by the device 2A is high enough to eliminate the need of making correction. The second threshold value is, for example, 5 m.

When the determining unit 214 determines that the error indicated by the error information 5A is less than the second threshold value (step ST19; NO), the operation moves to step ST22.

In addition, when the determining unit 214 determines that the error indicated by the error information 5A is equal to or greater than the second threshold value (step ST19; YES), the transmission control unit 215 generates the correction information S10 (step ST20).

As described above, the correction information S10 includes the first vector information V1, the second vector information V2, and the third vector information V3. When the device 2B corresponds to a first electronic device, the first vector information V1 is information indicating the vector BA. When the device 2C corresponds to a second electronic device, the second vector information V2 is information indicating the vector CA. When the device 2D corresponds to a third electronic device, the third vector information V3 is information indicating the vector DA. These are generated by the determining unit 214 in the process of step ST18.

The transmission control unit 215 transmits the correction information S10 to the server 1 (step ST21).

On the other hand, in step ST22, the transmission control unit 215 determines that the position information is not corrected (step ST22), and generates the position notification information S11 including the device ID 3A and the position information 4A held by the storage unit 22 (step ST23). Then, the operation moves to step ST21.

Figure 7:
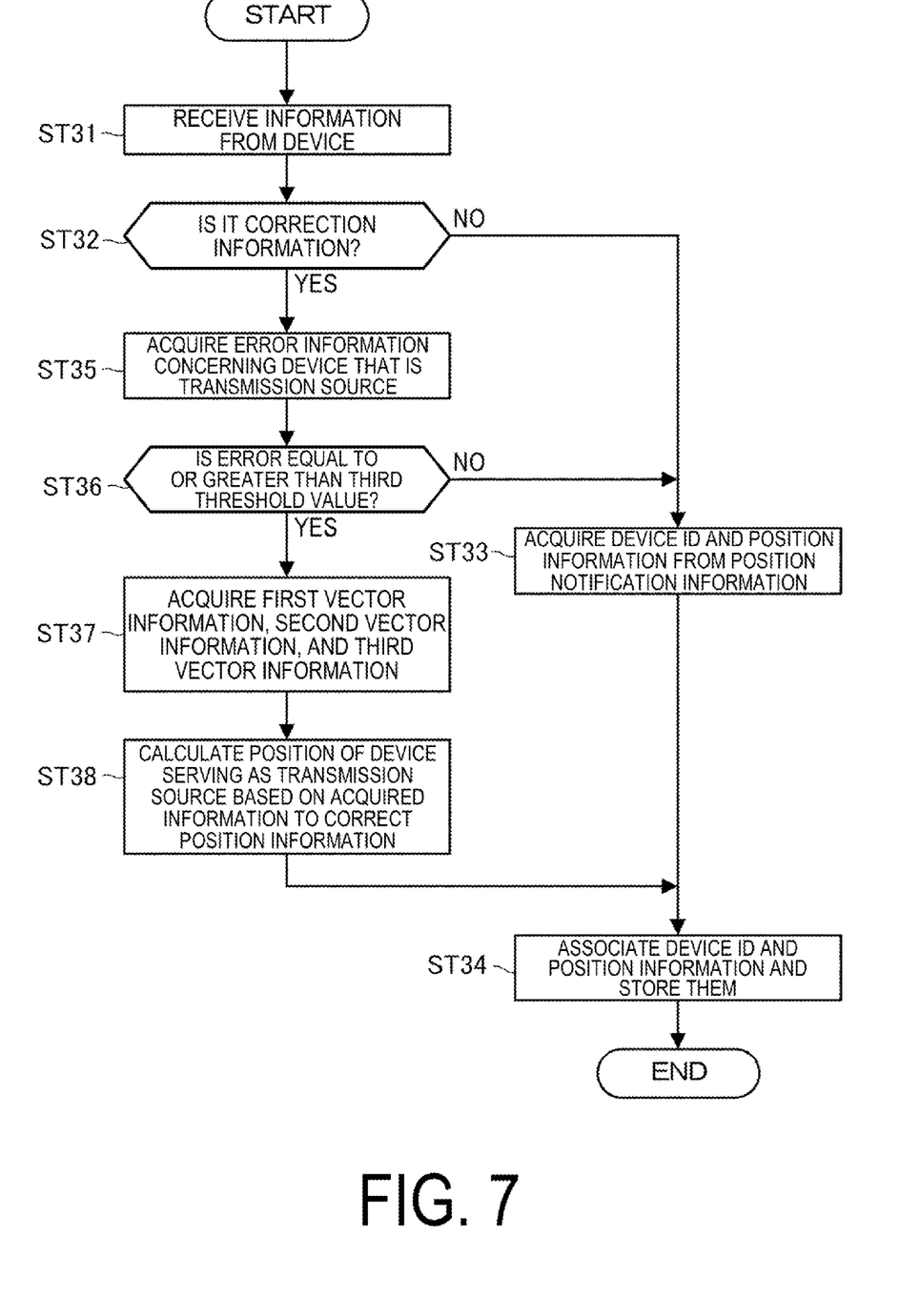
FIG. 7 is a flowchart illustrating operation of a server.

FIG. 7 is a flowchart illustrating operation of the server 1.

When the device 2 transmits the correction information S10 or the position notification information S11, the server 1 receives these pieces of information with the server communicating unit 13 (step ST31). The server control unit 11 determines whether the received information is the correction information S10 (step ST32).

When the information received by the server 1 is not the correction information S10 (step ST32; NO), the information received by the server 1 is the position notification information S11. In this case, the server control unit 11 acquires the device ID 3 and the position information 4 from the received position notification information S11 (step ST33). The server control unit 11 associates the acquired position information 4 with the device ID 3, and causes the server storage unit 12 to store it (step ST34).

When the information received by the server 1 is the correction information S10 (step ST32; YES), the server control unit 11 acquires, from the correction information S10, the error information 5 concerning the device 2 serving as the transmission source from which the correction information S10 is transmitted (step ST35). For example, the server control unit 11 acquires the error information 5A from the correction information S10 transmitted by the device 2A.

The server control unit 11 determines whether an error indicated by the error information 5 acquired in step ST35 is equal to or greater than a third threshold value (step ST36). Step ST36 is a process of determining whether the accuracy of the position information 4 included in the correction information S10 is high enough to eliminate the need of making a correction. The third threshold value is, for example, 5 m. The third threshold value is a value that the server storage unit 12 stores in advance.

When the server control unit 11 determines that an error indicated by the error information 5 is less than the third threshold value (step ST36; NO), the operation moves to step ST33.

When the server control unit 11 determines that an error indicated by the error information 5 is equal to or greater than the third threshold value (step ST36; YES), the operation moves to step ST37. In step ST37, the server control unit 11 acquires, from the correction information S10, the first vector information V1, the second vector information V2, and the third vector information V3 (step ST37).

The server control unit 11 calculates the position of the device 2 that is the transmission source of the correction information S10 based on the first vector information V1, the second vector information V2, and the third vector information V3, thereby correcting the position information 4 (step ST38).

Here, the process of step ST38 will be described in detail.

Figure 8:
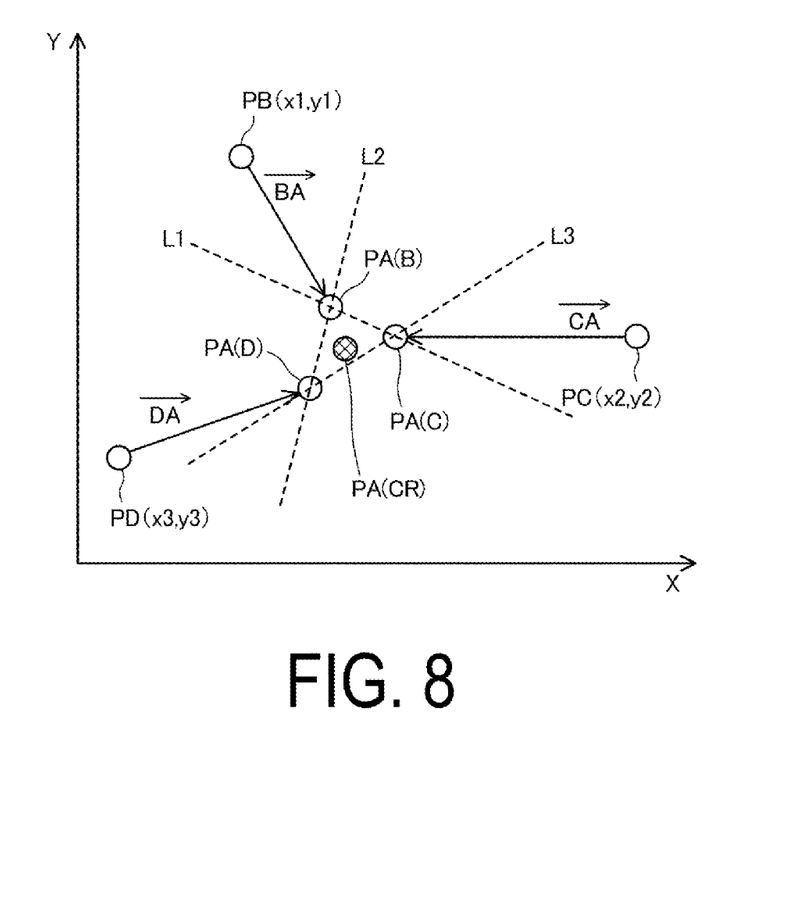
FIG. 8 is an explanatory diagram illustrating a process in which the server calculates a position.

FIG. 8 is an explanatory diagram illustrating a process performed by the server 1 to calculate the position. In FIG. 8, the position PB indicates the position of the device 2B indicated by the position information 4B included in the correction information S10. Similarly, the positions PC and PD indicate positions of the devices 2C and 2D indicated by the position information 4C and 4D, respectively, included in the correction information S10.

The server control unit 11 obtains the coordinates of the positions PB, PC, and PD in the X-Y rectangular coordinate system based on the position information 4B, 4C, and 4D. The coordinate (x1, y1) is the coordinate indicated by the position information 4B. The coordinate (x2, y2) is the coordinate indicated by the position information 4C. The coordinate (x3, y3) is the coordinate indicated by the position information 4D.

The server control unit 11 obtains the position PA of the device 2A based on the position PB and the first vector information V1. The first vector information V1 is information indicating the direction and the magnitude of the vector from the position PB to the position PA, and hence, it is possible to identify the position PA based on the position PB and the first vector information V1. Here, the position PA obtained with reference to the position PB is referred to as a position PA(B).

Similarly, the server control unit 11 performs a process of obtaining the position PA based on the position PC and the second vector information V2, and performs a process of obtaining the position PA based on the position PD and the third vector information V3. The position PA obtained with the position PC being the reference is referred to as a position PA(C). The position PA obtained with the position PD being the reference is referred to as a position PA(D).

The server control unit 11 obtains an equation of a line L1 passing through the position PA(B) and the position PA(C), an equation of a line L2 passing through the position PA(B) and the position PA(D), and an equation of a line L3 passing through the position PA(C) and the position PA(D). For example, the lines L1, L2, and L3 can be expressed by the following Equations (3), (4), and (5). Here, the r1, r2, r3, p1, p2, p3, q1, q2, and q3 each represents a constant value.

[Equations 3, 4, and 5]

$$L1 : r1 = p1x + q1y \quad (3)$$

$$L2 : r2 = p2x + q2y \quad (4)$$

$$L3 : r3 = p3x + q3y \quad (5)$$

The server control unit 11 calculates values of x and y at which the square of the difference between the three lines L1, L2, and L3 expressed by the Equations (3), (4), and (5) described above is minimized. Specifically, the server control unit 11 obtains a value (x, y) at which the value P obtained by the Equation (6) described below is minimized. The coordinate (x, y) calculated through this process represents the corrected position PA(CR) of the device 2A, and turns to be corrected position information 4.

[Equation 6]

$$P = (p1x + q1y - r1)^2 + (p2x + q2y - r2)^2 + (p3x + q3y - r3)^2 \quad (6)$$

4. Effect or the Like

As described above, the information processing system 100 according to the present disclosure includes the server 1. The information processing system 100 includes the device 2A including the first communicating unit 23, the second communicating unit 24, the position detector 27, the information acquiring unit 211, the determining unit 214, and the transmission control unit 215. The first communicating unit 23 is configured to communicate with a plurality of other devices 2B, 2C, and 2D. The second communicating unit 24 is configured to communicate with the server 1. The position detector 27 is configured to detect the position. The information acquiring unit 211 is configured to acquire the position information 4B, 4C, 4D for each of the other devices 2B, 2C, and 2D and the error information 5B, 5C, and 5D indicating an error in the position information 4B, 4C, 4D. The determining unit 214 determines whether the device 2A is surrounded by the plurality of other devices 2B, 2C, and 2D based on the position information 4B, 4C, 4D for each of the other devices 2B, 2C, and 2D, and determines whether the device 2A is in a specific state in which the error information 5B, 5C, and 5D for each of the other devices 2B, 2C, and 2D all indicates the first threshold value or less. The transmission control unit 215 transmits the correction information S10 including the position of the device 2A and the position information 4B, 4C, 4D to the server 1 when the device 2A is determined to be surrounded by the plurality of devices 2B, 2C, and 2D and to be in the specific state. The server 1 corrects the position of the device 2A based on the correction information S10.

With this configuration, when the device 2A is surrounded by the devices 2B, 2C, and 2D, it is possible to correct the position of the device 2A by using the position information 4B, 4C, and 4D regarding the devices 2B, 2C, and 2D around the device 2A. During this correction, the device 2A determines whether the state is in the specific state appropriate to correct the position of the device 2A, and the device 2 acquires the position information 4B, 4C, and 4D used for correction. Thus, it is possible to perform appropriate correction. In addition, with the server 1 performing the process of correcting the position of the device 2A, it is possible to eliminate the need for the device 2A to perform high-load computation processing. Thus, it is possible to correct the position of the device 2A while reducing the power consumption of the device 2A.

In the configuration described above, the position detector 27 includes the GNSS reception unit 28 configured to receive a radio wave transmitted by the artificial satellite SAT and generate the position information 4A corresponding to first information concerning the position of the device 2A and the error information 5A corresponding to second information concerning an error in the position information 4A. Thus, in the configuration in which the GNSS is used to detect the position of the device 2A, when the reception state of the radio waves from the artificial satellite SAT is expected to be poor, it is possible to correct the position of the device 2A while reducing the power consumption of the device 2A.

In the configuration described above, the transmission control unit 215 transmits the correction information S10 to the server 1 when, in the specific state, the second information concerning the device 2A indicates an error equal to or greater than the second threshold value. With this configuration, when the accuracy of the position information 4A is not favorable, the position information 4A is corrected. This makes it possible to avoid an unnecessary correction process, which makes it possible to operate the information processing system 100 in a more efficient manner.

In the configuration described above, the plurality of other devices 2B, 2C, and 2D include a first electronic device, a second electronic device, and a third electronic device. In this case, the determining unit 214 generates the first vector information V1, the second vector information V2, and the third vector information V3. The first vector information V1 indicates the direction where the device 2B is located with the device 2A being the reference and the distance from the device 2A to the device 2B. The second vector information V2 indicates the direction where the device 2C is located with the device 2A being the reference and the distance from the device 2A to the device 2C. The third vector information V3 indicates the direction where the device 2D is located with the device 2A being the reference and the distance from the device 2A to the device 2D. The transmission control unit 215 transmits, to the server 1, the correction information S10 including the first vector information V1, the second vector information V2, and the third vector information V3. With this configuration, it is possible to correct the position information 4A based on the distances to the devices 2B, 2C, and 2D and the direction of the devices 2B, 2C, and 2D with the position of the device 2A being the reference.

In the configuration described above, the determining unit 214 determines whether the device 2 is surrounded by the device 2B, the device 2C, and the device 2D, based on the first vector information V1, the second vector information V2, and the third vector information V3. Thus, the device 2A can correctly determine whether the position information 4A needs to be corrected and the device 2A is in a state of being able to acquire information appropriate for the correction. In addition, since the server 1 does not need to determine the state of the device 2A, this provides an advantage in which it is possible to reduce the load that the server 1 bears.

In the configuration described above, the correction information S10 includes the position information 4B concerning the device 2B, the position information 4C concerning the device 2C, the position information 4D concerning the device 2D, the first vector information V1, the second vector information V2, and the third vector information V3. The server 1 performs computation using a least square method based on the first position, the second position, and the third position to correct the position of the device 2A. The first position is a position of the device 2A that is obtained based on the position information 4B concerning the device 2B and the first vector information V1. The second position is a position of the device 2A that is obtained based on the position information 4C concerning the device 2C and the second vector information V2. The third position is a position of the device 2A that is obtained based on the position information 4D concerning the device 2D and the third vector information V3. With this configuration, it is possible to highly accurately correct the position information 4A concerning the device 2A based on the information concerning the devices 2B, 2C, and 2D.

In the configuration described above, the device 2A includes the posture estimating unit 212 configured to estimate the posture of the device 2A based on the acceleration and the angular velocity of the device 2A. The determining unit 214 identifies the front direction of the device 2A based on the posture of the device 2A, and generates the first vector information V1, the second vector information V2, and the third vector information V3 with the front direction being the reference. This configuration enables the device 2A to appropriately acquire information used to correct the position information 4A.

In the configuration described above, the correction information S10 includes the error information 5A that is second information concerning the device 2A, and the server 1 corrects the position information 4A that is the first information concerning the device 2A when the error information 5A included in the correction information S10 indicates an error equal to or greater than a third threshold value. With this configuration, the server 1 determines whether the position information 4 needs to be corrected, and the server 1 corrects the position information 4 when there is an error that necessitates correction. Thus, by avoiding an unnecessary correction process, it is possible to operate the information processing system 100 in an efficient manner. In addition, since the third threshold value can be changed in the server 1, it is possible to adjust the third threshold value serving as a reference as to whether to perform correction, without affecting the operation of the device 2.

5. Other Embodiments

The embodiment described above is a preferred embodiment of the disclosure. However, the disclosure is not limited to this embodiment, and various modifications can be applied to the exemplary embodiment without departing from the gist of the present disclosure.

Each of the functional units of the information processing system 100 illustrated in FIG. 1 is only illustrated as functional configurations, and does not particularly limit a specific implementation. Hardware that individually corresponds to each of the functional units illustrated in the drawing need not be implemented. Needless to say, it is possible to employ a configuration in which functions of a plurality of functional units are achieved by one processor executing a program. In addition, a portion of functions achieved by software in each of the embodiments described above may be achieved by hardware. Furthermore, a portion of functions achieved by hardware may be achieved by software.

In addition, as for a unit of process illustrated in FIGS. 4 and 7, processing is divided in accordance with main process contents in order to facilitate understanding of the processes of each of the units in the information processing system 100. Thus, the present disclosure is not limited by the manner in which the processing is divided into units or by the name. These processes can be further divided into a larger number of units of process in accordance with process contents. In addition, these processes can be divided such that one unit of process includes more processes.

What is claimed is:

1. An information processing system comprising:
    a server; and
    an electronic device,
    the electronic device including:
        a first communicating unit configured to communicate with a plurality of other electronic devices,
        a second communicating unit configured to communicate with the server,
        a position detector configured to detect a position,
        an information acquiring unit configured to acquire position information for each of the plurality of other electronic devices and error information indicating an error in the position information for each of the plurality of other electronic devices,
        a determining unit configured to determine, based on the position information for each of the plurality of other electronic devices, whether the electronic device is surrounded by the plurality of other electronic devices, and determine whether the electronic device is in a specific state in which the error information for each of the plurality of other electronic devices all indicates a first threshold value or less, and
        a transmission control unit configured to transmit correction information including the position and the position information to the server when the electronic device is determined to be surrounded by the plurality of other electronic devices and to be in the specific state, wherein the server corrects the position of the electronic device based on the correction information.

2. The information processing system according to claim 1, wherein
the position detector includes a GNSS reception unit configured to receive a radio wave transmitted by an artificial satellite and generate first information concerning a position of the electronic device and second information concerning an error in the first information.

3. The information processing system according to claim 2, wherein
the transmission control unit transmits the correction information to the server when, in the specific state, the second information concerning the electronic device indicates an error equal to or greater than a second threshold value.

4. The information processing system according to claim 1, wherein
the plurality of other electronic devices include a first electronic device, a second electronic device, and a third electronic device,
the determining unit generates first vector information, second vector information, and third vector information,
the first vector information indicating a direction where the first electronic device is located with the electronic device being a reference and a distance from the electronic device to the first electronic device,
the second vector information indicating a direction where the second electronic device is located with the electronic device being a reference and a distance from the electronic device to the second electronic device, and
the third vector information indicating a direction where the third electronic device is located with the electronic device being a reference and a distance from the electronic device to the third electronic device, and
the transmission control unit transmits, to the server, the correction information including the first vector information, the second vector information, and the third vector information.

5. The information processing system according to claim 4, wherein
the determining unit determines whether the electronic device is surrounded by the first electronic device, the second electronic device, and the third electronic device, based on the first vector information, the second vector information, and the third vector information.

6. The information processing system according to claim 4, wherein
the correction information includes:
the position information concerning the first electronic device,
the position information concerning the second electronic device,
the position information concerning the third electronic device,
the first vector information,
the second vector information, and
the third vector information,
the server performs computation using a least square method based on a first position of the electronic device, a second position of the electronic device, and a third position of the electronic device, and corrects the position of the electronic device,
the first position being obtained based on the position information concerning the first electronic device and the first vector information,
the second position being obtained based on the position information concerning the second electronic device and the second vector information, and
the third position being obtained based on the position information concerning the third electronic device and the third vector information.

7. The information processing system according to claim 4, wherein
the electronic device includes a posture estimating unit configured to estimate posture of the electronic device based on acceleration and an angular velocity of the electronic device and
the determining unit identifies a front direction of the electronic device based on the posture of the electronic device, and generates the first vector information, the second vector information, and the third vector information with the front direction being a reference.

8. The information processing system according to claim 2, wherein
the correction information includes the second information concerning the electronic device and
the server corrects the first information concerning the electronic device when the second information included in the correction information indicates an error equal to or greater than a third threshold value.

9. An electronic device comprising:
a first communicating unit configured to communicate with a plurality of other electronic devices;
a second communicating unit configured to communicate with a server;
a position detector configured to detect a position;
an information acquiring unit configured to acquire position information for each of the plurality of other electronic devices and error information indicating an error in the position information for each of the plurality of other electronic devices;
a determining unit configured to determine, based on the position information for each of the plurality of other electronic devices, whether the electronic device is surrounded by the plurality of other electronic devices, and determine whether the electronic device is in a specific state in which the error information for each of the plurality of other electronic devices all indicates a first threshold value or less; and
a transmission control unit configured to transmit correction information including the position and the position information to the server when the electronic device is determined to be surrounded by the plurality of other electronic devices and to be in the specific state.

10. The information processing system according to claim 1, wherein
the determining unit determines whether a number of the plurality of other electronic devices surrounding the electronic device is three or more, and
the transmission control unit transmits the correction information when the number of the plurality of other electronic devices surrounding the electronic device is three or more and the electronic device is in the specific state.

11. The information processing system according to claim 1, wherein the plurality of other electronic devices comprises a first electronic device, a second electronic device, and a third electronic device, the server corrects the position of the electronic device based on a first position of the electronic device, a second position of the electronic device, and a third position of the electronic device, wherein the first position, the second position, and the third position of the electronic device are respectively obtained based on a position of the first electronic device, a position of the second electronic device, and a position of the third electronic device.

* * * * *